(12) United States Patent
Amaral

(10) Patent No.: US 10,226,976 B2
(45) Date of Patent: Mar. 12, 2019

(54) BALL HITCH COVER

(71) Applicant: Kenneth Amaral, Crows Landing, CA (US)

(72) Inventor: Kenneth Amaral, Crows Landing, CA (US)

(*) Notice: Subject to any disclaimer, the term of this patent is extended or adjusted under 35 U.S.C. 154(b) by 63 days.

(21) Appl. No.: 15/639,858

(22) Filed: Jun. 30, 2017

(65) Prior Publication Data
US 2018/0001722 A1    Jan. 4, 2018

Related U.S. Application Data

(60) Provisional application No. 62/356,769, filed on Jun. 30, 2016.

(51) Int. Cl.
B60D 1/60    (2006.01)
F16D 3/84    (2006.01)

(52) U.S. Cl.
CPC ............. *B60D 1/605* (2013.01); *B60D 1/60* (2013.01); *F16D 3/84* (2013.01)

(58) Field of Classification Search
CPC ... B60D 1/605; B60D 1/60; Y10T 403/32737; F16D 3/84
See application file for complete search history.

(56) References Cited

U.S. PATENT DOCUMENTS

| | | | | |
|---|---|---|---|---|
| 1,598,482 A * | 8/1926 | Lance | ............ | B60G 7/005 403/135 |
| 1,645,247 A * | 10/1927 | Loock | ............ | F16D 3/848 403/135 |
| 2,616,717 A | 11/1952 | Leon | | |
| 2,714,912 A | 8/1955 | Peter | | |
| 3,968,981 A * | 7/1976 | Suarez | ............ | B60D 1/06 280/511 |
| 4,181,320 A | 1/1980 | Wellborn | | |
| 4,993,739 A * | 2/1991 | Putnam | ............ | B60D 1/06 280/511 |
| D336,880 S | 6/1993 | Drummond | | |
| 6,382,656 B1 * | 5/2002 | Johnson, Jr. | ............ | B60D 1/06 280/506 |
| 6,832,775 B1 | 12/2004 | Muller | | |
| 2014/0199113 A1 * | 7/2014 | Nordloh | ............ | B22D 19/12 403/122 |

FOREIGN PATENT DOCUMENTS

EP    0274160 A1 *   7/1988   ............ B60D 1/60

* cited by examiner

*Primary Examiner* — Joseph M Rocca
*Assistant Examiner* — Daniel S Yeagley
(74) *Attorney, Agent, or Firm* — Global Intellectual Property Agency, LLC; Daniel Boudwin

(57) ABSTRACT

A ball hitch cover. The ball hitch cover includes a front tab and a pair of side tabs connected to a lower end of the front tab. Each side tab includes a first edge having a first width and a second edge having a second width, wherein the second edge width is greater than the first edge width. A pair of rear tabs are disposed opposing the front tab, such that each rear tab is disposed adjacent to the second edge of one of the side tabs of the pair of side tabs. A length of each rear tab of the pair of rear tabs is greater than a length of the front tab. The ball hitch cover is flexible and configured to conform to the shape of a ball hitch and is securable thereto via an adhesive disposed on an inner side of the ball hitch cover.

7 Claims, 3 Drawing Sheets

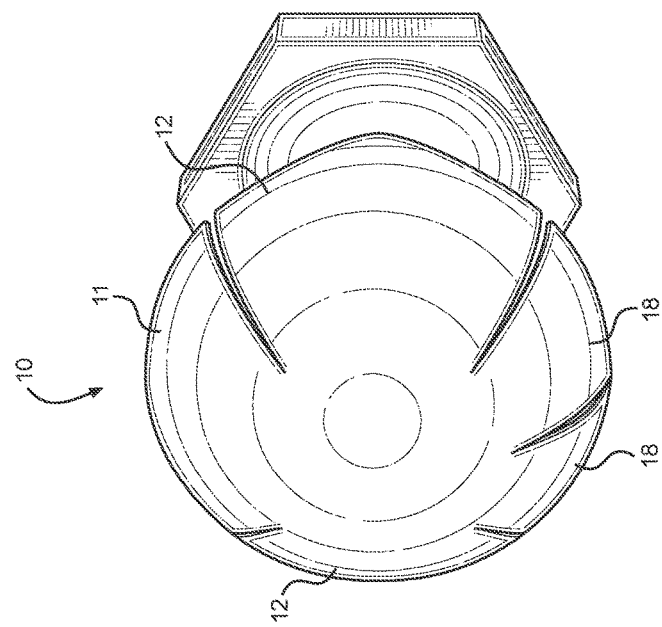
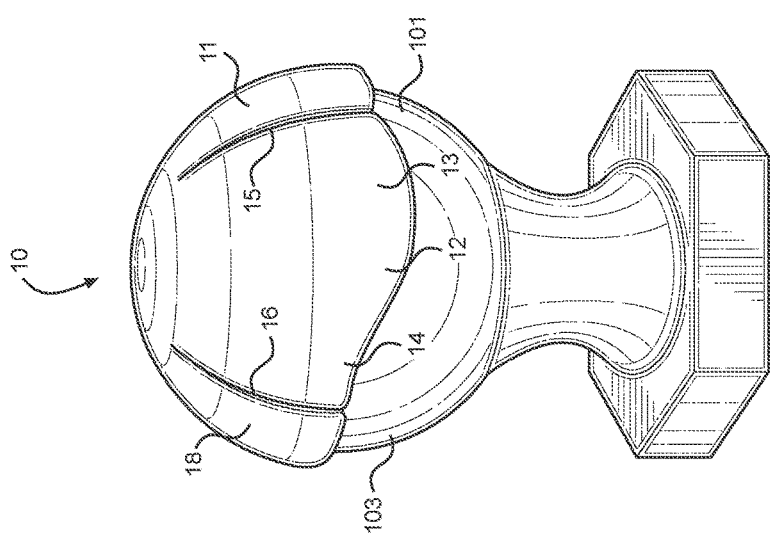
FIG. 2A
FIG. 2B

BALL HITCH COVER

CROSS REFERENCE TO RELATED APPLICATIONS

This application claims the benefit of U.S. Provisional Application No. 62/356,769 filed on Jun. 30, 2016. The above identified patent application is herein incorporated by reference in its entirety to provide continuity of disclosure.

FIELD OF THE INVENTION

The present invention relates to hitch covers. More specifically, the present invention provides a ball hitch cover configured to adhere to different sized ball hitches.

BACKGROUND OF THE INVENTION

Vehicles typically tow trailers via a ball hitch system. The ball hitch system includes a ball hitch and a hitch receiver. The ball hitch may be secured to the vehicle and the hitch receiver may be secured to the trailer, or in the alternative the ball hitch may be secured to the trailer and the hitch receiver secured to the vehicle. Since the ball hitch is typically left secured to the trailer or vehicle, the ball hitch is often exposed to inclement weather and other environmental hazards. Excessive wear to the ball hitch may necessitate its replacement, which can be costly and time consuming. The ball hitch can also wear down over time via continuous frictional contact with a hitch receiver. Some individuals utilize lubricant to prevent such wear, however this can be a messy and difficult process. In order to address these concerns, the present invention provides a ball hitch cover that can be secured to different sized ball hitches.

Devices have been disclosed in the known art relating to ball hitch covers. These include devices that have been patented and published in patent application publications. However, the devices in the known art have several drawbacks. The devices in the known art are typically only able to be used with a single size ball hitch and provide no adjustment options. Further, the devices in the known art lack a configuration that does not interfere with a connecting member extending from the ball hitch.

In light of the devices disclosed in the prior art, it is submitted that the present invention substantially diverges in design elements from the prior art and consequently it is clear that there is a need in the art for an improvement to existing ball hitch covers. In this regard the present invention substantially fulfills these needs.

SUMMARY OF THE INVENTION

In view of the foregoing disadvantages inherent in the known types of ball hitch covers now present in the prior art, the present invention provides a ball hitch cover wherein the same can be utilized for providing convenience for the user when applying a protective covering to a ball hitch. The ball hitch cover comprises a front tab and a pair of side tabs connected to a lower end of the front tab. Each side tab includes a first edge having a first width and a second edge having a second width, wherein the second edge width is greater than the first edge width. A pair of rear tabs are disposed opposing the front tab, such that each rear tab is disposed adjacent to the second edge of one of the side tabs of the pair of side tabs. A length of each rear tab of the pair of rear tabs is shorter than a length of the front tab. The ball hitch cover is flexible and configured to conform to the shape of a ball hitch and is securable thereto via an adhesive disposed on an inner side of the ball hitch cover. The ball hitch cover is configured to conform any size ball hitch in order to protect the ball hitch from wear from the elements or from wear caused by continuous contact with a hitch receiver.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2A shows a side view of the ball hitch cover secured to a ball hitch.

FIG. 2B shows a top down view of the ball hitch cover secured to a ball hitch.

DETAILED DESCRIPTION OF THE INVENTION

Figure 1B:
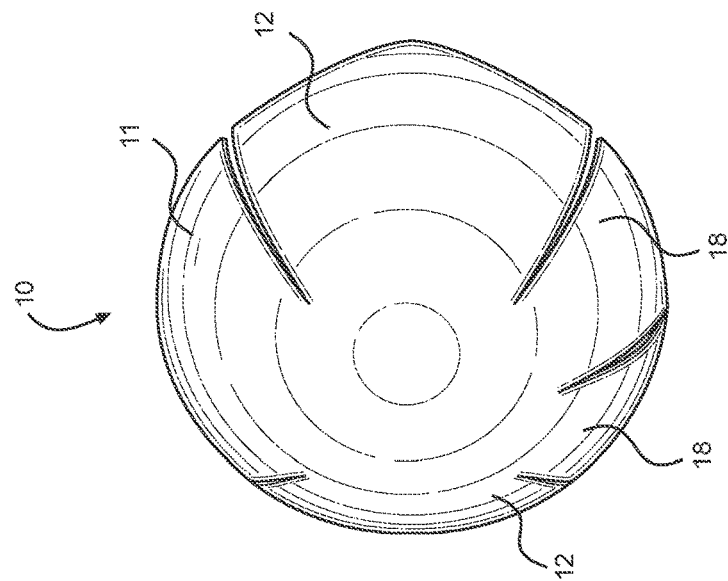
FIG. 1B shows a top down view of the ball hitch cover in a contracted configuration.

Reference is made herein to the attached drawings. Like reference numerals are used throughout the drawings to depict like or similar elements of the ball hitch cover. For the purposes of presenting a brief and clear description of the present invention, the preferred embodiment will be discussed as used for a protective covering for a ball hitch. The figures are intended for representative purposes only and should not be considered to be limiting in any respect.

Figure 1A:
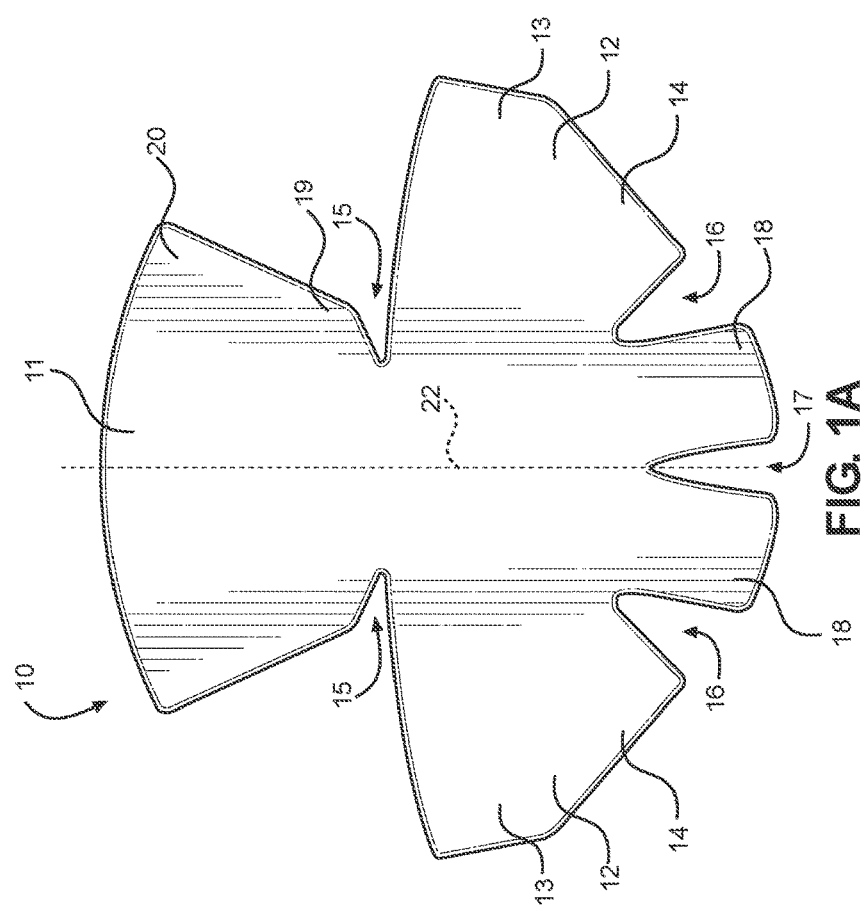
FIG. 1A shows a top down view of the ball hitch cover in an expanded configuration.

Referring now to FIGS. 1A and 1B, there is shown a top down view of the ball hitch cover in an expanded configuration and a top down view of the ball hitch cover in a contracted configuration, respectively. The ball hitch cover 10 is a flexible cover that can be secured to any size ball hitch for protective purposes. The ball hitch cover 10 comprises a front tab 11 having an upper end 20 and a lower end 19. The front tab 11 tapers inwardly from the upper end 20 to the lower end 19. In the shown embodiment, the front tab 11 comprises an arcuate edge.

A pair of side tabs 12 are connected to the lower end 19 of the front tab 11 on opposing sides thereof. Each side tab 12 includes a first edge 13 and a second edge 14 adjacent thereto. The width of the first edge 13 is greater than the width of the second edge 14. The first edge 13 is coextensive with the second end 14 and is offset at an obtuse angle therefrom.

The ball hitch cover 10 further comprises a pair of rear tabs 18. Each rear tab 18 is disposed adjacent to the second edge 14 of one of the side tabs 12. The rear tabs 18 extend rearward in a direction opposing the front tab 11. Additionally, the front tab 11 is greater in length than the rear tabs 18 so that the rear tabs 18 do not interfere with any connection between the hitch and the vehicle. In the shown embodiment, the left side and the right side of the ball hitch cover 10, defined by a center line 22, are symmetrical.

The ball hitch cover 10 further comprises a plurality of notches 15, 16, 17 that allow the ball hitch cover 10 to fold adjustably and conform to ball hitches of different sizes. A pair of front notches 15 are disposed on opposing sides of the front tab 11, such that each notch 15 is disposed between the front tab 11 and one of the side tabs 12. A side notch 16 is disposed between the second edge 14 of each side tab 12 and each rear tab 18. A rear notch 17 is disposed between the pair of rear tabs 18. The placement and sizing of the notches allows the ball hitch cover fold inwardly such that it conforms to the spherical shape of the ball hitch. Further, the notches allow the curvature of the ball hitch cover 10 to be adjusted so that it can conform to different sized ball hitches. In some embodiments, the sides of each notch contact one another when disposed around the ball hitch in order to prevent gaps between the notches so as to completely enclose the ball hitch.

Referring now to FIGS. 2A and 2B, there is shown a side view of the ball hitch cover secured to a ball hitch and a top down view of the ball hitch cover secured to a ball hitch, respectively. The ball hitch cover 10 is securable to a ball hitch 101 via an adhesive disposed on an inner side that contacts the ball hitch 101 and adheres thereto. In an alternative embodiment, each of the front tab 11, side tabs 12, and rear tabs 18 are biased inward such that the tabs frictionally engage the ball hitch 10. As visible in FIG. 2A, the front tab 11 is longer than the rear tabs 18, such that a rear portion 103 of the ball hitch 101 is exposed. Additionally, the second edge 14 of the side tabs 12 tapers upward toward the lower end of the rear tabs 18.

Figure 3:
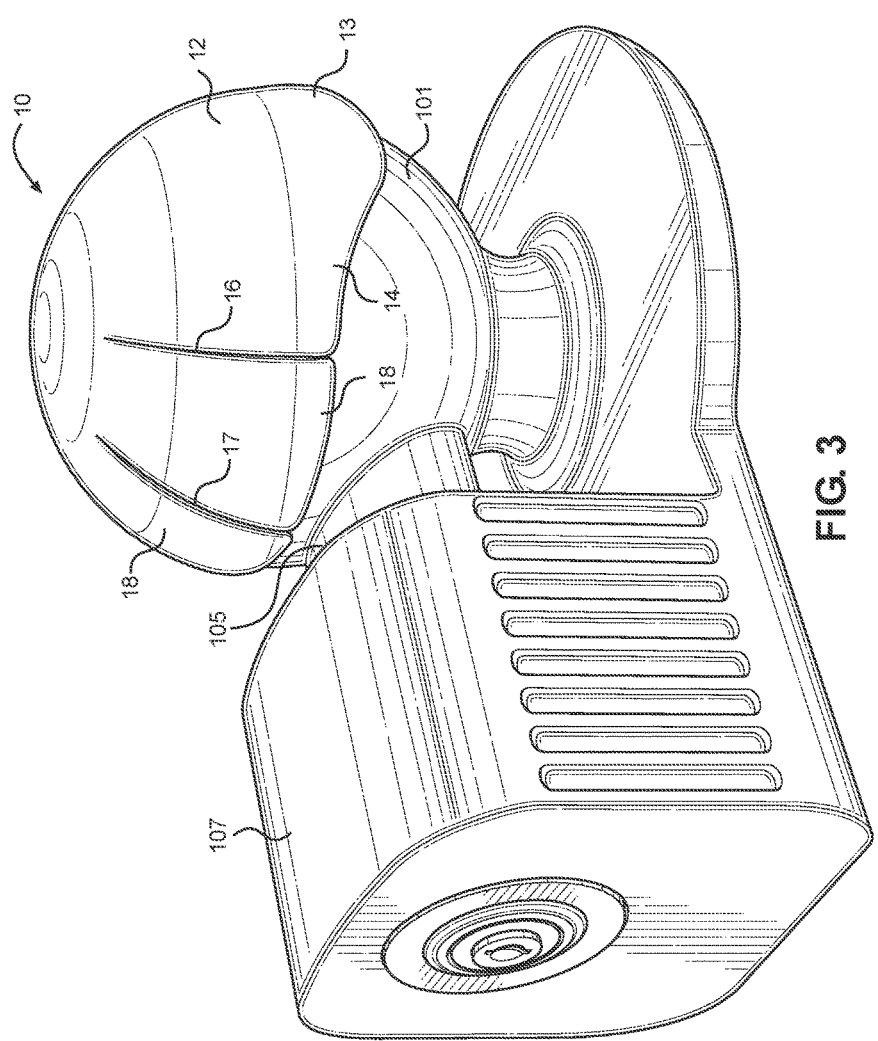
FIG. 3 shows a perspective view of the ball hitch cover secured to a ball hitch.

Referring now to FIG. 3, there is shown a perspective view of the ball hitch cover secured to a ball hitch. The ball hitch 101 includes a connecting member 105 extending rearward therefrom. The connecting member 105 connects to a mounting bracket 107. The mounting bracket 107 is securable to either the rear of a vehicle or to a trailer to be towed. The ball hitch cover 10 is secured to the ball hitch 101 in an orientation such that the rear tabs 18 are positioned over the connecting member 105. The shorter length of the rear tabs 18 ensures that they do not contact or interfere with the connecting member 105 that connects the ball hitch 101 to the mounting bracket 107. The ball hitch cover 10 extends downward from the second edge 14 to the first edge 13 of the side tabs 12 and towards the front tab, so that as much of the ball hitch 101 as possible is covered while still avoiding contact with the connecting member 105. In this way, the ball hitch 101 is protected when exposed to harsh weather or when connected to a hitch receiver. Additionally, the ball hitch 101 may be composed of a low friction material such as Teflon® so that the ball hitch 101 is able to rotate within the hitch receiver.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ball hitch cover, comprising:
    a front tab;
    a pair of side tabs connected to a lower end of the front tab, each side tab of the pair of side tabs comprising a first edge having a first width and a second edge having a second width, wherein the second edge width is greater than the first edge width;
    a pair of rear tabs, each rear tab of the pair of rear tabs disposed adjacent to the second edge of one of the side tabs of the pair of side tabs;
    wherein a length of each rear tab of the pair of rear tabs is shorter than a length of the front tab;
    wherein the ball hitch cover is configured to conform and secure to a ball hitch.

2. The ball hitch cover of claim 1, wherein the front tab comprises an arcuate edge.

3. The ball hitch cover of claim 1, wherein the front tab tapers inwardly from an upper end of the front tab to the lower end thereof.

4. The ball hitch cover of claim 1, wherein the pair of rear tabs extend in a direction opposing the front tab.

5. The ball hitch cover of claim 1, further comprising a left side on a first side of a central dividing line and a right side on a second side of the central dividing line, wherein the right side and the left side are symmetrical.

6. The ball hitch cover of claim 1, wherein an inner side the ball hitch cover configured to contact the ball hitch comprises an adhesive thereon.

7. The ball hitch cover of claim 1, further comprising:
    a pair of front notches disposed on opposing sides of the front tab;
    a pair of side notches, each side notch of the pair of side notches disposed between one of the side tabs of the pair of side tabs and one of the rear tabs of the pair of rear tabs;
    a rear notch disposed between the pair of rear tabs.

* * * * *